Oct. 10, 1950     P. J. ERNISSE     2,525,534
ELEVATING MECHANISM
Filed Nov. 5, 1947
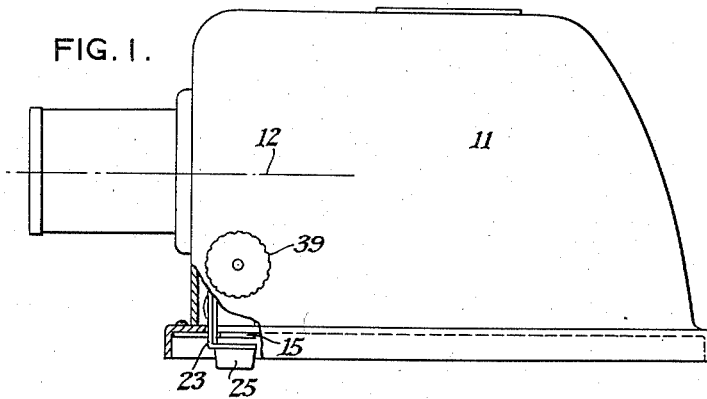
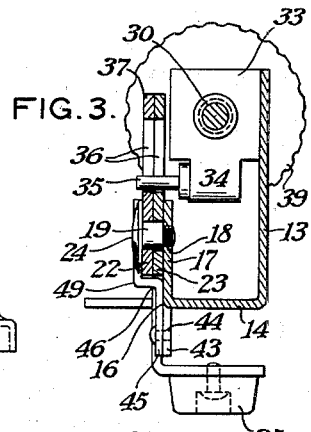
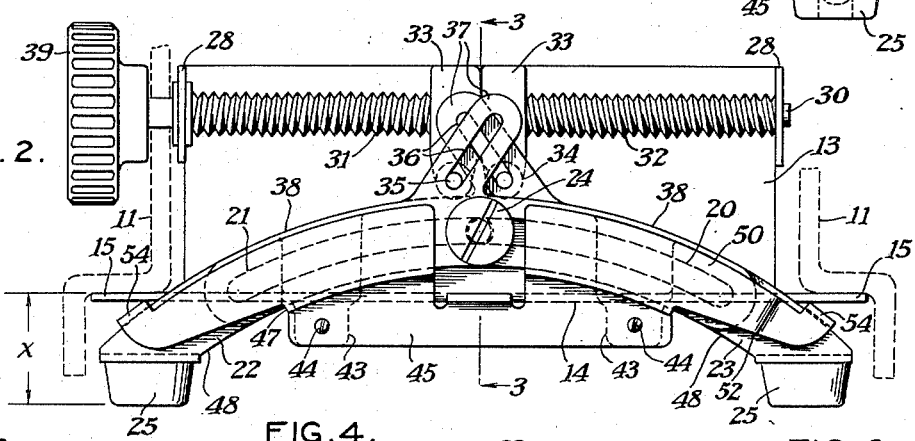
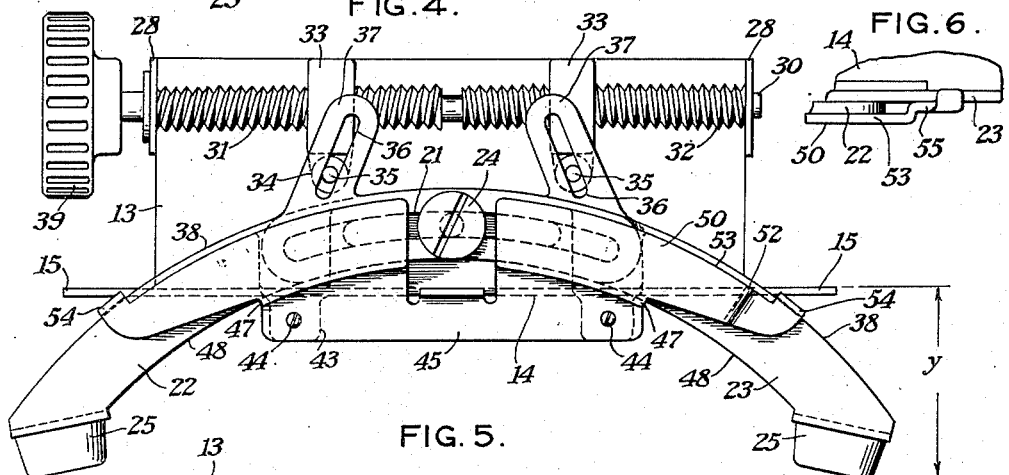
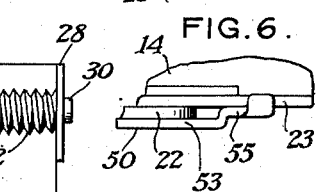
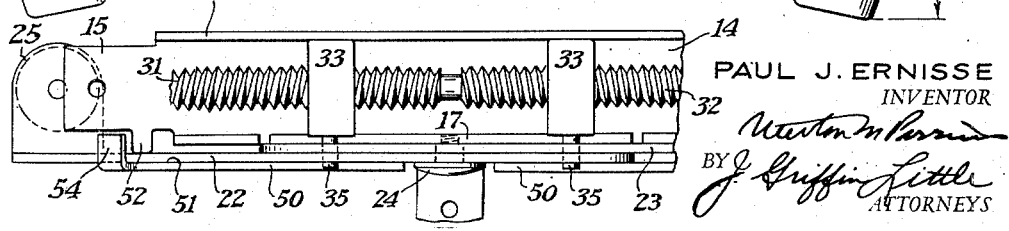
PAUL J. ERNISSE
INVENTOR
BY
ATTORNEYS Patented Oct. 10, 1950

2,525,534

UNITED STATES PATENT OFFICE 2,525,534

ELEVATING MECHANISM

Paul J. Ernisse, Rochester, N. Y., assignor to Eastman Kodak Company, Rochester, N. Y., a corporation of New Jersey Application November 5, 1947, Serial No. 784,180

9 Claims. (Cl. 248—11)

The present invention relates to an elevating mechanism primarily designed for use with a slide projector, motion picture projector, or similar devices; but adapted for a wide range of other uses.

It has been common practice to provide such devices with elevating mechanisms for tilting the projection angle so as to position the projected image properly on the viewing screen. Some of these mechanisms constitute a single threaded member positioned at the front of the device. Such members are very unstable, particularly when at or near their maximum elevation. Other mechanisms provide separate adjustable legs at the front of the projector, both legs usually requiring separate adjustment to secure the desired screen image location. The disadvantages of this separate adjustable two-leg arrangement will be readily apparent to those skilled in the art.

The present invention overcomes these difficulties by providing a two-legged support or elevating mechanism at the front of the device, and an adjusting mechanism by which both legs are simultaneously and equally moved to vary the spacing between the end or supporting portions of the legs so as to secure the necessary position or elevation by a single adjustment. Furthermore, when the highest elevation is reached, the supporting portions of the legs have their maximum spacing, thus affording the desired stability.

The present invention has as its principal object the provision of an elevating mechanism which is stable in all positions of adjustment.

A still further object of the invention is the provision of an elevating mechanism which is simple to operate.

Yet another object of the invention is the provision of an elevating mechanism in which a pair of supporting legs are simultaneously moved in opposite directions to provide a mechanism the points of support of which separate as the mechanism is adjusted for increased elevation.

To these and other ends, the invention resides in certain improvements and combinations of parts, all as will be hereinafter more fully described, the novel features being pointed out in the claims at the end of the specification.

In the drawings:

Fig. 1 is a side elevation view of a slide projector, with parts in section, showing the relation thereto of an elevating mechanism constructed in accordance with the present invention;

Fig. 2 is a front elevation view of the elevating mechanism of the present invention, on a larger scale than Fig. 1, adjusted to provide the minimum elevation;

Fig. 3 is a vertical sectional view taken substantially on line 3—3 of Fig. 2, showing the relation of the various parts of the elevating mechanism of the present invention;

Fig. 4 is a view similar to Fig. 2, and showing the mechanism adjusted for a higher elevation than that in Fig. 2; and Fig. 5 is a plan view of the elevating mechanism of the present invention, showing the relation of the parts.

Fig. 6 is a plan view of an intermediate portion of the leg members.

Similar reference numerals throughout the various views indicate the same parts.

The elevating mechanism of the present invention is adapted to be connected to the front end of a projector 11, or similar apparatus, to move the front end to elevate or lower the projecting axis 12 of the projector. The elevating mechanism comprises a support in the form of an angle plate having a rear vertical wall 13 and a lower horizontal and forwardly extending bottom wall 14. The lateral ends of the bottom wall 14 are provided with laterally projecting ears 15 to which the side walls of the projector housing may be secured, as shown in dotted lines in Fig. 2. The front edge 16 of the bottom 14 has formed up therefrom a centrally located lug 17 which is spaced from and substantially parallel to the rear wall 13, as best shown in Fig. 3.

The lug 17 is formed with a threaded aperture 18 adapted to receive the threaded end of a pin the shank 19 of which projects through a pair of aligned arcuate-shaped slots 20 and 21 formed in a pair of arcuate shaped leg members 23 and 22 respectively, as best shown in Figs. 2 and 4. The leg members are arranged in overlapping relation, and are held in sliding contact between the lug 17 and the enlarged head 24 on the pin, as best shown in Fig. 3. The outer end of each leg 22 and 23 is provided with a foot member 25 which is adapted to engage a table-top, or similar supporting surface.

The upper portions 28 of the side edges of the rear wall 13 are bent forwardly to provide a pair of spaced parallel bearings for a shaft or rod 30 which is provided with oppositely threaded portions 31 and 32. Each threaded portion has mounted thereon a threaded nut 33 which is adapted to move axially along the rod 30 as the latter is rotated. Each nut is, in turn, formed with a depending boss 34 to which is secured a forwardly extending pin 35 adapted to extend into an elongated slot 36 formed in an upwardly inclined projection ear 37 on one of the arcuate arms 22 and 23 and projecting from the upper edge 38 thereof, as best shown in Fig. 4. Thus, each arm 22 and 23 is connected to the threaded rod 30 through an ear 37, pin 35, boss 34 and nut 33.

It will now be apparent that when the rod 30 is rotated, the nuts 33, due to the opposite threading of the portions 31 and 32, move in opposite directions along the rod to simultaneously move the pins 35. The engagement of the latter with the ears 37 will shift the latter simultaneously in opposite directions, as illustrated in Figs. 2 and 4, to move the leg members 22 and 23 in opposite directions to vary the spacing of the foot members 25. The direction of movement of the foot members 25 depends, of course, on the direction of rotation of the rod 30. Fig. 2 shows the members 25 positioned for the minimum elevation X, in which position the nuts 33 are in substantial engagement at the inner ends of threaded portions 31 and 32. The rod 30 is provided with a knob 39 by which it may be rotated. Now when the knob 39 is rotated in a counter-clockwise direction, as viewed from the left end of Figs. 2 and 4, the rod 30 is similarly rotated so as to move the nuts 33 in opposite directions along the rod and away from each other to vary the spacing therebetween. Such movement also separates ears 37 to shift the legs 22 and 23 outwardly and in the opposite direction. Due to the arcuate shape of these legs, such outward movement causes the foot members 25 not only to move outwardly but also downwardly so that the members 25 are now spaced a distance Y below the member 14, which distance is greater than the distance X, as is apparent from a comparison of Figs. 2 and 4. As the rotation of the rod 30 is continued, the nuts 33 move further along the threaded portions 31 and 32 to shift the foot members 25 still further outwardly and downwardly to complete the elevation of the supporting member, as well as increasing the spacing of the foot members 25.

In order to secure the desired stability, it is desirable that the leg members 22 and 23 move along an arcuate path when the rod 30 is rotated. To secure this result, the present invention provides suitable guide means which engage the leg members to guide the latter along such paths. To this end, the front end 16 of the bottom member 14 has formed thereon a pair of down turned ears 43 positioned on opposite sides of the central lug 17, as shown in Figs. 2 and 4. These lugs are formed with threaded openings adapted to receive screws 44 which extend through the lower part 45 of a Z-shaped plate to secure the latter to the ears 43. The portion 45 thus tightly engages the ears 43, as shown in Fig. 3. The plate is bent forwardly along the lines 46 to form an intermediate portion 47 which has an arcuate shape conforming to the shape of and which engages the lower edges 48 of the two leg members 22 and 23, as clearly illustrated in Figs. 2 and 4. The plate is again bent along line 49 to provide an upper flat portion 50 which is positioned above and in parallel relation to the lower portion 45.

The leg members 22 and 23 are in overlapping relation, the right leg 23 positioned behind the left leg 22. With this arrangement, the inner surface 51 of the part 50 cooperates with a small forwardly projecting tongue 52 on bottom 14 to hold the left leg member 22 therebetween to restrict the movement of the leg 22 in a plane during the movement thereof. As the right leg 23 is set back, the right end of the portion 50 is bent backwardly, as shown at 55 in Fig. 6, so that the right leg 23 may be guided between the inner surface of the portion 55 and the front edge 16 of the bottom 14. Thus, the two leg members are held or guided during their relative sliding movement. In addition, the upper edges 53 of the portions 50 and 55 are arcuate in shape to conform with the arcuate leg members, and terminate in bent-over lugs 54 which engage the upper edges 38 of the legs 22 and 23 to cooperate with the arcuate portions 47 to provide an arcuate guide for the legs 22 and 23, as is apparent from an inspection of Figs. 2 and 4. By means of these guides, the leg members 22 and 23 are forced to move along arcuate paths, with each leg member being held in a single plane during movement, so as to vary the spacing of the feet 25 and thus alter the vertical distance between the feet and the bottom 14 while at the same time spreading the feet further apart as the elevation is increased.

The present invention thus provides an elevating mechanism which can be readily and quickly adjusted to alter the position of the optical axis of the projector. Also, the mechanism is stable in all positions of adjustment, and can be readily and easily moved from one position to another.

While one embodiment of the invention has been disclosed, it is to be understood that the inventive idea may be carried out in a number of ways. This application is, therefore, not to be limited to the precise details disclosed, but is intended to cover all variations and modifications thereof falling within the scope of the appended claims.

I claim:

1. An elevating mechanism comprising, in combination, a support, a pair of arcuate leg members arranged in overlapping relation, a supporting foot secured to the outer end of each of said members, each member being formed with an arcuate slot, a pin carried by said support and extending through the slots of said members, means for moving said members in opposite directions along said pin to vary the elevation between said feet and said support, and means for guiding said leg members.

2. An elevating mechanism comprising, in combination, a support, a pair of arcuate leg members arranged in overlapping relation, a supporting foot secured to the outer end of each of said members, each member being formed with an arcuate slot, a pin carried by said support and extending through the slots of said members, means for moving said members in opposite directions along said pin to vary the elevation between said feet and said support, means for guiding said members to limit the movement thereof along an arcuate path, and means engaging each of said members to retain each member in the same plane during movement.

3. An elevating mechanism comprising, in combination, a support, a pair of flat arcuate leg members arranged in overlapping relation, a supporting foot secured to the outer end of each of said members, each member being formed with an arcuate slot, a pin carried by said support and extending through the slots of said members, means including a threaded member operatively connected to said members for moving the latter in opposite directions along said pin, and means for guiding said leg members.

4. An elevating mechanism comprising, in combination, a support, a pair of flat arcuate leg members arranged in overlapping relation, a supporting foot secured to the outer end of each of said members each member being formed with an arcuate slot, a pin carried by said support and extending through the slots of said members, a rotatable member carried by said support, oppositely threaded portions formed on said rotatable members, means for separately connecting said portions to said leg members so that the latter will be slid in opposite directions along said pin upon rotation of said rotatable member to vary the elevation between said feet and said support, and means for guiding said leg members during movement.

5. An elevating mechanism comprising, in combination, a support, a pair of flat arcuate leg members arranged in overlapping relation, a supporting foot secured to the outer end of each of said members, each member being formed with an arcuate slot, a pin carried by said support and extending through the slots of said members, a rotatable member carried by said support, oppositely threaded portions formed on said rotatable members, a nut threadably engaging each of said portions, means for separately connecting said nuts to said leg members so that rotation of said rotatable member will move said nuts in opposite direction along said portions to slide said leg members in opposite directions along said pin to vary the vertical distance between said support and feet, and means for guiding said leg members during their sliding movement.

6. An elevating mechanism comprising, in combination, a support, a pair of flat arcuate leg members arranged in overlapping relation, a supporting foot secured to the outer end of each of said members, each member being formed with an arcuate slot, a pin carried by said support and extending through the slots of said members, a rotatable member carried by said support, oppositely threaded portions formed on said rotatable members, a nut threadably engaging each of said portions, means including a pin and slot for separately connecting said nuts to said leg members so that rotation of said rotatable member will move said nuts in opposite directions along said portions to slide said leg members in opposite directions along said pin to vary the elevation between said support and feet, and means for guiding said leg members.

7. An elevating mechanism comprising, in combination, a support, a pair of flat arcuate leg members arranged in overlapping relation, a supporting foot secured to the outer end of each of said members, each member being formed with an arcuate slot, a pin carried by said support and extending through the slots of said members, a rotatable member carried by said support, oppositely threaded portions formed on said rotatable members, a nut threadably engaging each of said portions, means including a pin and slot for separately connecting said nuts to said leg members so that rotation of said rotatable member will move said nuts in opposite directions along said portions to slide said leg members in opposite directions along said pin to vary the elevation between said support and feet, and means carried by said support for guiding said leg members for movement along an arcuate path.

8. An elevating mechanism comprising, in combination, a support, a pair of flat arcuate leg members arranged in overlapping relation, a supporting foot secured to the outer end of each of said members, each member being formed with an arcuate slot, a pin carried by said support and extending through the slots of said members, a rotatable member carried by said support, oppositely threaded portions formed on said rotatable members, a nut threadably engaging each of said portions, means including a pin and slot for separately connecting said nuts to said leg members so that rotation of said rotatable member will move said nuts in opposite directions along said portions to slide said leg members in opposite directions along said pin to vary the elevation between said support and feet, means carried by said support for guiding said leg members for movement along an arcuate path, and means engaging each of said leg members to retain each member in a single plane during movement.

9. An elevating mechanism comprising, in combination, a support, a pair of flat arcuate-shaped leg members arranged in overlapping relation, each of said leg members being formed with an arcuate-shaped slot, a supporting foot secured to the outer end of each leg member, a shaft rotatably supported at its ends on said support, oppositely threaded portions on said shaft, nuts threadably engaging said portions, a depending lug formed on each nut, a forwardly projecting pin carried by each of said lugs, an ear formed on each leg member and provided with an elongated aperture to receive one of said pins to provide pin and slot connections between the legs and said lugs, a headed pin carried by said support and extending through said arcuate slots to connect said leg members to said support, the rotation of said shaft serving to move said nuts axially thereof to move said leg members in opposite directions by reason of said pin and slot connections to vary the elevation between said feet and said support, and guide means carried by said support and cooperating with said headed pin for guiding said leg members during movement.

PAUL J. ERNISSE.

REFERENCES CITED

The following references are of record in the file of this patent:

UNITED STATES PATENTS

| Number | Name | Date |
|---|---|---|
| 2,298,087 | Stechbert | Oct. 6, 1942 |
| 2,415,820 | Herring | Feb. 18, 1947 |